(12) United States Patent
Kim

(10) Patent No.: US 12,381,376 B2
(45) Date of Patent: Aug. 5, 2025

(54) SWITCHBOARD

(71) Applicant: LS ELECTRIC CO., LTD., Anyang-si (KR)

(72) Inventor: Byoungchul Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 176 days.

(21) Appl. No.: 18/019,016

(22) PCT Filed: Mar. 8, 2021

(86) PCT No.: PCT/KR2021/002804
§ 371 (c)(1),
(2) Date: Jan. 31, 2023

(87) PCT Pub. No.: WO2022/025380
PCT Pub. Date: Feb. 3, 2022

(65) Prior Publication Data
US 2023/0216280 A1    Jul. 6, 2023

(30) Foreign Application Priority Data

Jul. 31, 2020    (KR) .................. 10-2020-0096311

(51) Int. Cl.
*H02B 1/04*    (2006.01)
*H01B 17/58*    (2006.01)
*H02B 1/20*    (2006.01)

(52) U.S. Cl.
CPC .............. *H02B 1/04* (2013.01); *H01B 17/583* (2013.01); *H02B 1/20* (2013.01)

(58) Field of Classification Search
CPC . H02B 11/04; H02B 1/20; H02B 1/04; H01B 17/583
See application file for complete search history.

(56) References Cited

U.S. PATENT DOCUMENTS

2007/0017904 A1*    1/2007    Meinherz ............... H01H 33/02
                                                                                218/48
2014/0118890 A1*    5/2014    Kubota .................. H02B 1/202
                                                                                361/627
(Continued)

FOREIGN PATENT DOCUMENTS

JP        2008295124 A        12/2008
KR        10-0397629 B1 *    11/2003    ............. H02B 11/12
(Continued)

OTHER PUBLICATIONS

International Search Report for related International Application No. PCT/KR2021/002804; action dated Feb. 3, 2022; (5 pages).
(Continued)

*Primary Examiner* — Timothy J Thompson
*Assistant Examiner* — Rhadames Alonzo Miller
(74) *Attorney, Agent, or Firm* — K&L Gates LLP

(57) ABSTRACT

The present disclosure has been conceived to solve the above-mentioned problem, and the objective of the present disclosure is to provide a switchboard capable of easily correcting a difference between a phase-to-phase distance of a breaker terminal and a phase-to-phase distance of a bus bar. A switchboard according to one embodiment of the present disclosure comprises: a first compartment into which a circuit breaker is introduced; a second compartment adjacent to the first compartment and provided with a bus bar; and an insulating bushing installed on a barrier contacting the first compartment and the second compartment, wherein the insulating bushing is provided with a connecting conductor, wherein the connecting conductor has one side connected to a breaker terminal of the circuit breaker, and the other side connected to the bus bar.

11 Claims, 16 Drawing Sheets

(56) References Cited

U.S. PATENT DOCUMENTS

2021/0065972 A1* 3/2021 Ma .......................... H01F 27/04
2022/0344095 A1* 10/2022 Park ....................... H01F 38/30

FOREIGN PATENT DOCUMENTS

| KR | 20140111878 A | 9/2014 | |
|---|---|---|---|
| KR | 10-1445628 B1 * | 10/2014 | ............ H01B 17/26 |
| KR | 10-1490176 B1 * | 2/2015 | ........... H01H 33/022 |
| KR | 20160061392 A | 5/2016 | |
| KR | 20190101691 A | 9/2019 | |
| KR | 10-2064819 B1 * | 2/2020 | ............ H02B 1/207 |

OTHER PUBLICATIONS

Written Opinion for related International Application No. PCT/KR2021/002804; action dated Feb. 3, 2022; (8 pages).

* cited by examiner

SWITCHBOARD

CROSS-REFERENCE TO RELATED APPLICATIONS

This application is the National Stage filing under 35 U.S.C. 371 of International Application No. PCT/KR2021/002804, filed on Mar. 8, 2021, which claims the benefit of earlier filing date and right of priority to Korea utility model Application No. 10-2020-0096311 filed on Jul. 31, 2020, the contents of which are all hereby incorporated by reference herein in their entirety.

FIELD

The present disclosure relates to a switchboard, and more particularly, to a switchboard with high connection compatibility between a breaker terminal and a bus bar.

BACKGROUND

In general, a circuit breaker is a power device installed in a portion of a power system to protect the power system and a load by breaking a circuit when an overcurrent or a fault current occurs.

Among other circuit breakers, especially, a vacuum circuit breaker is a product for protecting human lives and load equipment in a manner that a vacuum interrupter (VI) disposed in the circuit breaker breaks the circuit using vacuum as extinguishing medium through an external relay, when fault currents, such as overcurrents, short-circuit, ground faults, occur in extra-high/high-voltage distribution lines.

This vacuum circuit breaker is typically installed in a switchboard in which various power devices are received and managed for operations or controls of power plants and substations, the operations of motors, and the like. Specifically, a circuit breaker main body is generally installed in a compartment defined in the switchboard on a cradle or truck.

FIGS. 1 to 3 illustrate a switchboard according to the related art. FIG. 1 is a perspective view of the related art switchboard.

The switchboard 1 allows a voltage or current to flow therealong while accommodating various power devices therein, and detects a fault state when a fault voltage or current occurs, so as to break a circuit breaker or provide information to another control device.

In the switchboard 1, a plurality of compartments are defined to accommodate such power devices according to the purpose of use, and each compartment has shielding and insulating performances prescribed by laws and regulations.

The compartments of the switchboard 1 may include a circuit breaker compartment 2 where a circuit breaker is accommodated, a bus bar compartment 3 through which bus bars and cables pass, a transformer compartment 4 where a potential transformer is accommodated, and a low-voltage device compartment 5 where low-voltage devices are accommodated.

At this time, it is common that frames or plates constituting each compartment and electric devices or internal parts inside the compartment are coupled to one another by bolts.

FIGS. 2 and 3 are lateral views of the circuit breaker compartment 2. Here, FIG. 2 illustrates a state in which a circuit breaker 6 is located at a test position, and FIG. 3 illustrates a state in which the circuit breaker is located at a service position.

The circuit breaker 6 is accommodated in the circuit breaker compartment 2. The circuit breaker 6 includes a main circuit part 7 and an opening/closing mechanism part 8, and a breaker terminal 9 is connected to the main circuit part 7. An insulating bushing 10 is provided on a rear surface of the circuit breaker compartment 2 to protect the breaker terminal 9 and bus bars 11 and improve insulating performance.

The breaker terminal 9 is inserted into the insulating bushing 10 and connected to the bus bars 11 at the service position of the circuit breaker 6 (see FIG. 3).

FIGS. 4A to 4C are top views illustrating the service position of the circuit breaker. A state in which the breaker terminal 9 is connected to the bus bars 11 in the insulating bushing 10 is illustrated.

The rating of a voltage to be applied to the circuit breaker 6 depends on a standard. Based on the IEC standard, a rated voltage may be applied within the range of 7.2 to 36 kV. In this way, when the rated voltage varies, an insulation distance also varies. That is, in a switchboard to which a large rated voltage is applied, a distance between phases (phase-to-phase distance) of the circuit breaker is increased and the insulating bushing 10 is manufactured in a large size, compared to a switchboard to which a small rated voltage is applied.

As such, when various rated voltages are applied, there may be a case in is which a distance between phases (phase-to-phase distance) of the bus bar 11 of the switchboard and a phase-to-phase distance of the main circuit part 7 of the circuit breaker 6 are different. In this case, a difference between the phase-to-phase distance of the bus bar 11 of the switchboard and the phase-to-phase distance of the main circuit part 7 of the circuit breaker 6 must be corrected (adjusted).

FIG. 4A illustrates a case where the phase-to-phase distance of the bus bar 11 of the switchboard is equal to the phase-to-phase distance of the main circuit part 7 of the circuit breaker 6. Since the phase-to-phase distance of the bus bar 11 of the switchboard and the phase-to-phase distance of the main circuit part 7 of the circuit breaker 6 are the same, the circuit breaker 6 is coupled to the bus bar 11, without a separate correction, when it enters the service position.

By the way, an insulation level of the vacuum circuit breaker is sufficient, but a size of measuring equipment, such as CT, which is installed in a bus bar compartment varies depending on a difference of manufacturing technology of the corresponding product for each country and company, and cost policy and strategy of a switchboard company. If such the measuring equipment has a large size, a larger (longer, farther) phase-to-phase distance of the bus bar is needed in consideration of an insulation level between phases. In this case, the phase-to-phase distance of the bus bar 11 and the phase-to-phase distance of the breaker terminal 9 must be corrected.

FIG. 4B illustrates a state in which the difference in distances between phases has been corrected by changing the bus bar 11 when the phase-to-phase distance of the bus bar 11 of the switchboard is longer than the phase-to-phase distance of the main circuit part 7 of the circuit breaker 6.

FIG. 4C illustrates a state in which the difference in distances between phases has been corrected by changing the breaker terminal 9 when the phase-to-phase distance of the bus bar 11 of the switchboard is longer than the phase-to-phase distance of the main circuit part 7 of the circuit breaker 6.

In the case of FIG. 4B, the bus bars 11 are bent or machined to reduce a phase-to-phase distance of end portions of the bus bars 11, and in the case of FIG. 4C, the breaker terminals 9 are bent or machined to increase a phase-to-phase distance of end portions of the breaker terminals 9.

The two correction methods are configured to meet required specifications by separately manufacturing either one of the bus bars 11 or the breaker terminals 9. These methods cause an increase in manufacturing costs and a difficulty in management due to addition of molds according to diversification of components.

SUMMARY

Technical Problem

The present disclosure has been made to solve those problems and other drawbacks, and one aspect of the present disclosure is to provide a switchboard capable of easily correcting a difference between a distance between phases of breaker terminals and a distance between phases of bus bars.

A switchboard according to one embodiment of the present disclosure may include a first compartment into which a circuit breaker is inserted, a second compartment adjacent to the first compartment and receiving bus bars therein, insulating bushings installed on a barrier that is in contact with the first compartment and the second compartment, wherein each of the insulating bushings may be provided with connecting conductors, and the connecting conductors each may be connected to a breaker terminal of the circuit breaker on one side thereof and to the bus bar on another side.

Here, the insulating bushing may be formed to have a different size from an insulating bushing of an adjacent phase, and a different width from the insulating bushing of the adjacent phase.

The insulating bushing may have a contact surface mediating a connection between the breaker terminal and the bus bar, and may include a sliding hole formed in the contact surface in a horizontal direction.

The sliding hole may be formed to have a different length from a sliding hole of an adjacent phase.

A work groove for assembling the bus bar may be formed in the sliding hole.

The connecting conductor may include a flat plate portion to which the bus bar is coupled, and an insertion portion protruding vertically from the flat plate portion, inserted into the sliding hole, and connected to the breaker terminal.

The connecting conductor may be formed symmetrically up and down with respect to the insertion portion.

A length of the insertion portion may be the same as a length of the flat plate portion.

The connecting conductor may further include an extension portion extending to one side from the flat plate portion.

A length of the sliding hole may be longer than a length of the insertion portion.

The connecting conductor may be provided with a plurality of fixing holes for fixing the connecting conductor to the insulating bushing.

The connecting conductor may be provided with a plurality of assembly holes for assembling the bus bar.

A fixing bar for fixing the bus bar may vertically protrude from a rear surface of the flat plate portion.

The fixing bar may be provided with an assembly slit for fixing the bus bar.

In a switchboard according to one embodiment of the present disclosure, a connecting conductor can be applied to correct a difference between a phase-to-phase distance of a breaker terminal and a phase-to-phase distance of a bus bar.

In addition to a flat plate portion to which the bus bar is connected and an insertion portion to which the breaker terminal is connected, the connecting conductor may further include an extension portion extending from the flat plate portion, which can allow correction of the difference between the phase-to-phase distance.

A sliding hole into which the insertion portion can be inserted may be formed in an insulating bushing of the switchboard to be rotatable or slidable, thereby adjusting a position or arrangement of the connecting conductor.

BRIEF DESCRIPTION OF THE DRAWINGS

FIGS. 2 and 3 are lateral views of a circuit breaker compartment according to the related art, wherein FIG. 2 illustrates a state in which a circuit breaker is located at a test position, and FIG. 3 illustrates a state in which the circuit breaker is located at a service position.

FIGS. 6 and 7 are lateral views of a circuit breaker compartment of a switchboard in accordance with one embodiment of the present disclosure, wherein FIG. 6 illustrates a state in which a circuit breaker is located at a test position, and FIG. 7 illustrates a state in which the circuit breaker is located at a service position.

DETAILED DESCRIPTION

Hereinafter, preferred embodiments of the present disclosure will be described with reference to the accompanying drawings, so that a person skilled in the art can easily carry out the disclosure. It should be understood that the technical idea and scope of the present disclosure are not limited to those preferred embodiments.

Figure 1:
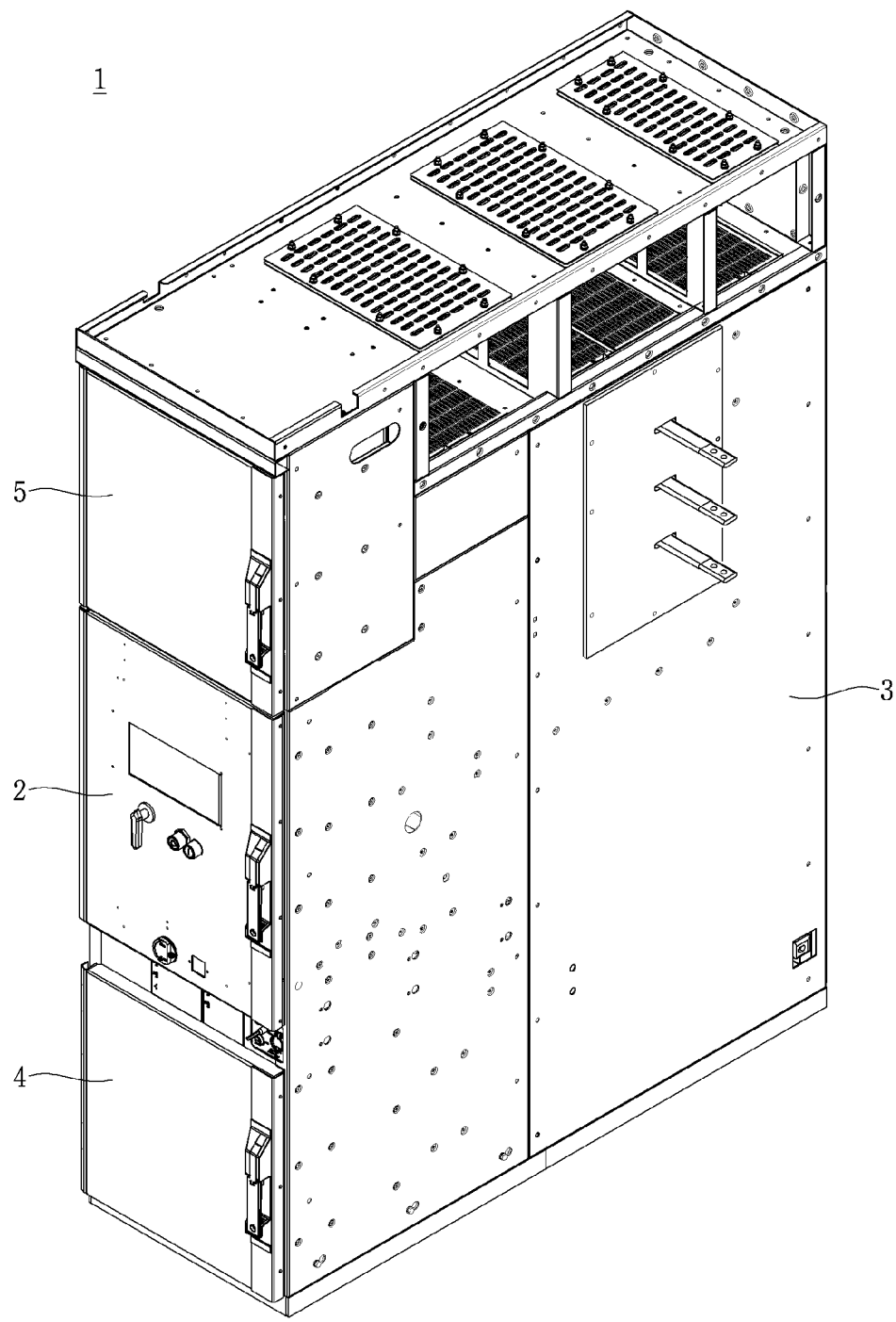
FIG. 1 is a perspective view of the related art switchboard.
Figure 2:
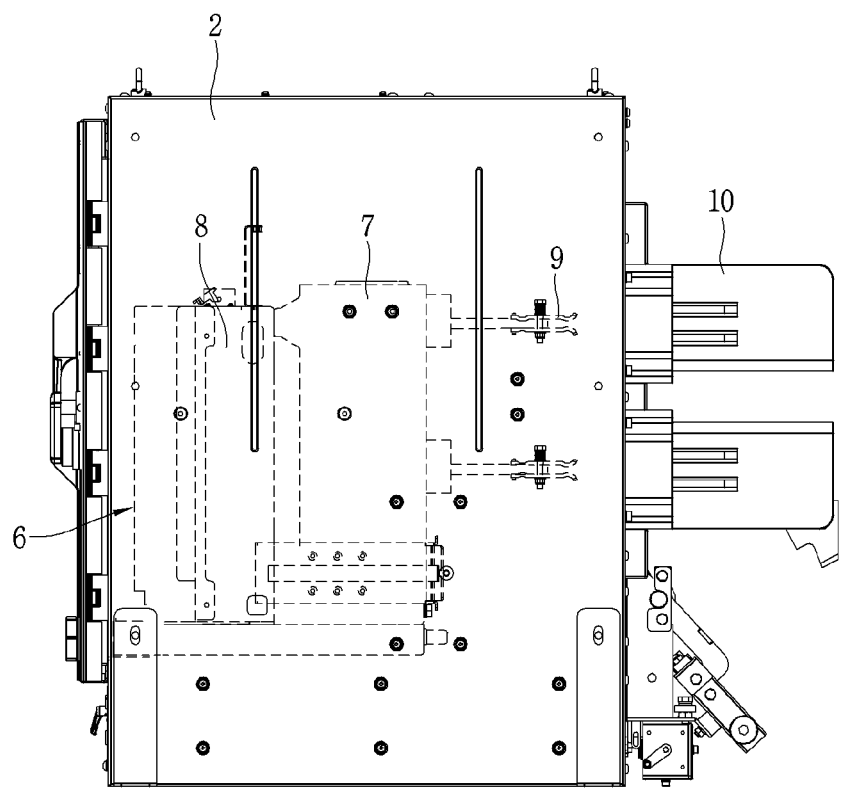
Figure 3:
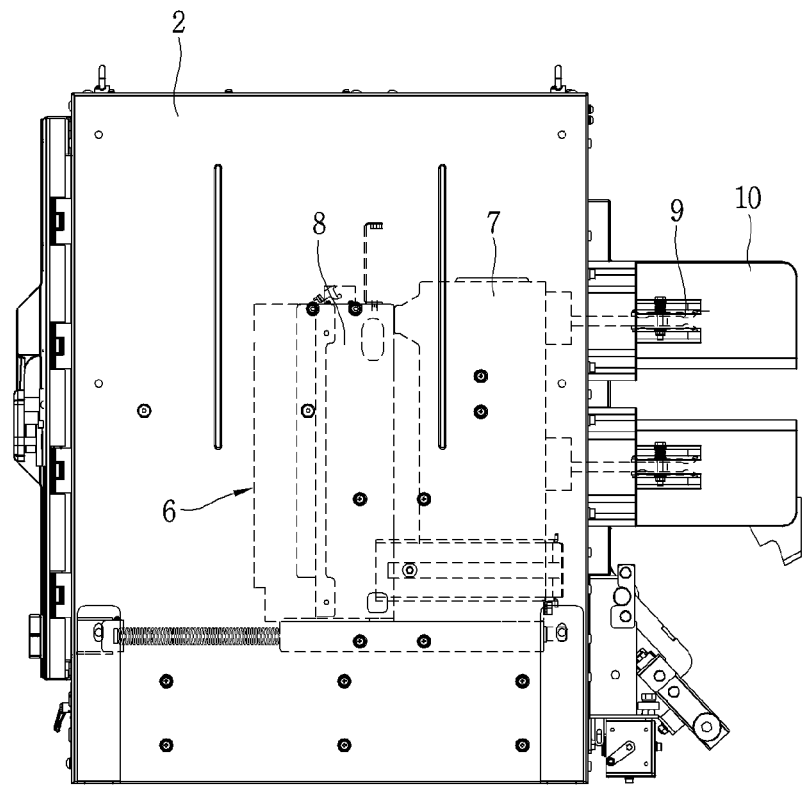
Figure 4A:
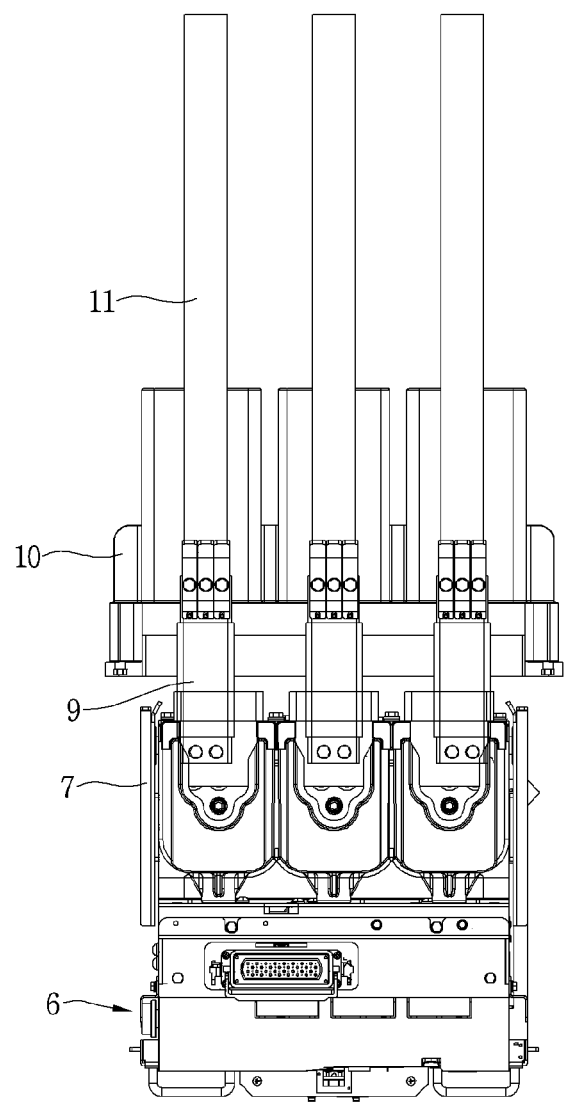
FIGS. 4A to 4C are views illustrating a connection relationship between breaker terminals and bus bars at a service position of a circuit breaker, in the related art switchboard.
Figure 4B:
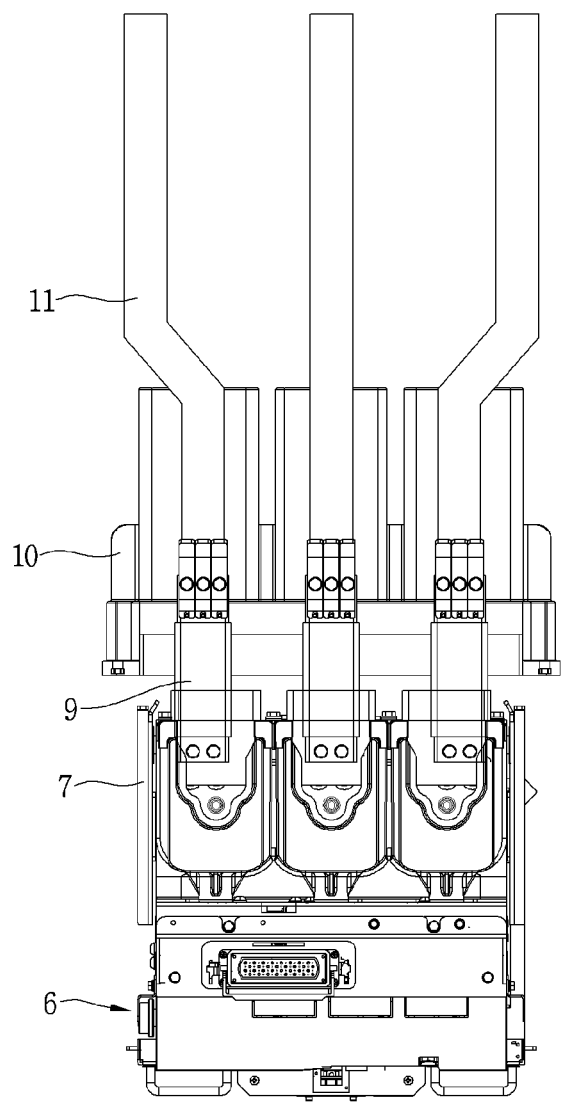
Figure 4C:
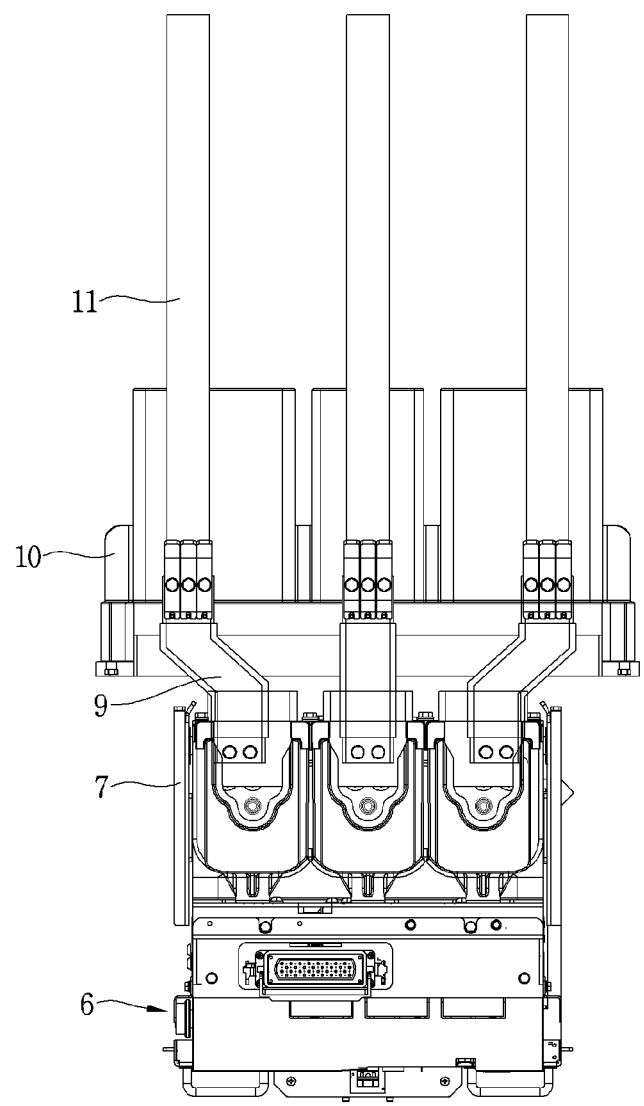
Figure 5:
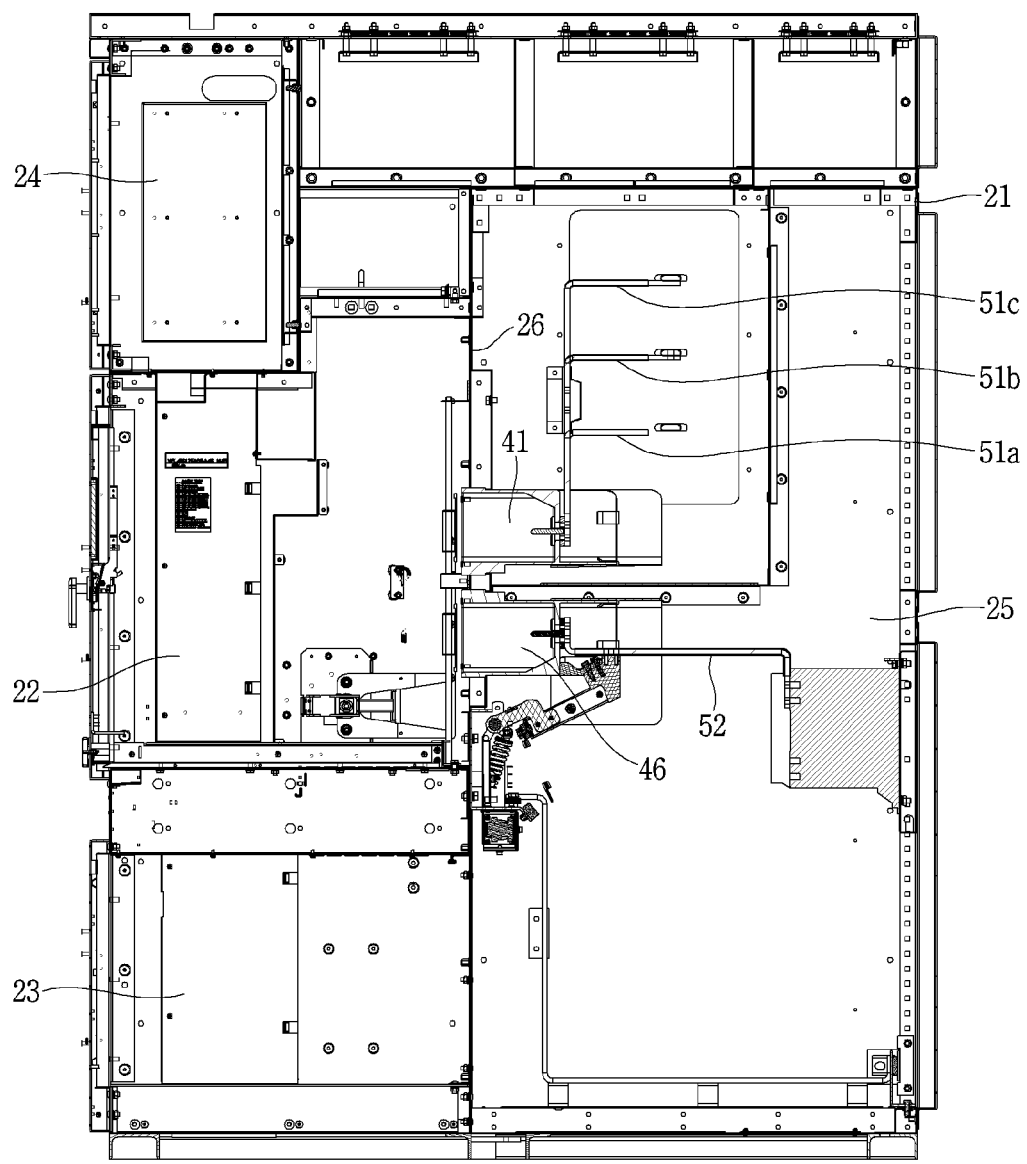
FIG. 5 is a front view of a switchboard in accordance with one embodiment of the present disclosure.
Figure 6:
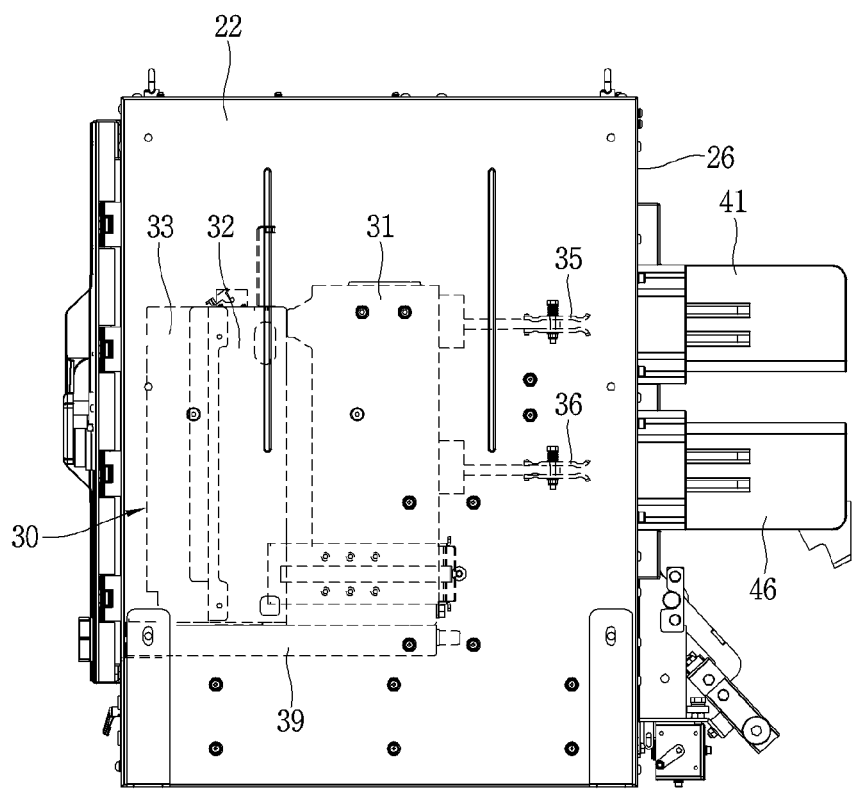
Figure 7:
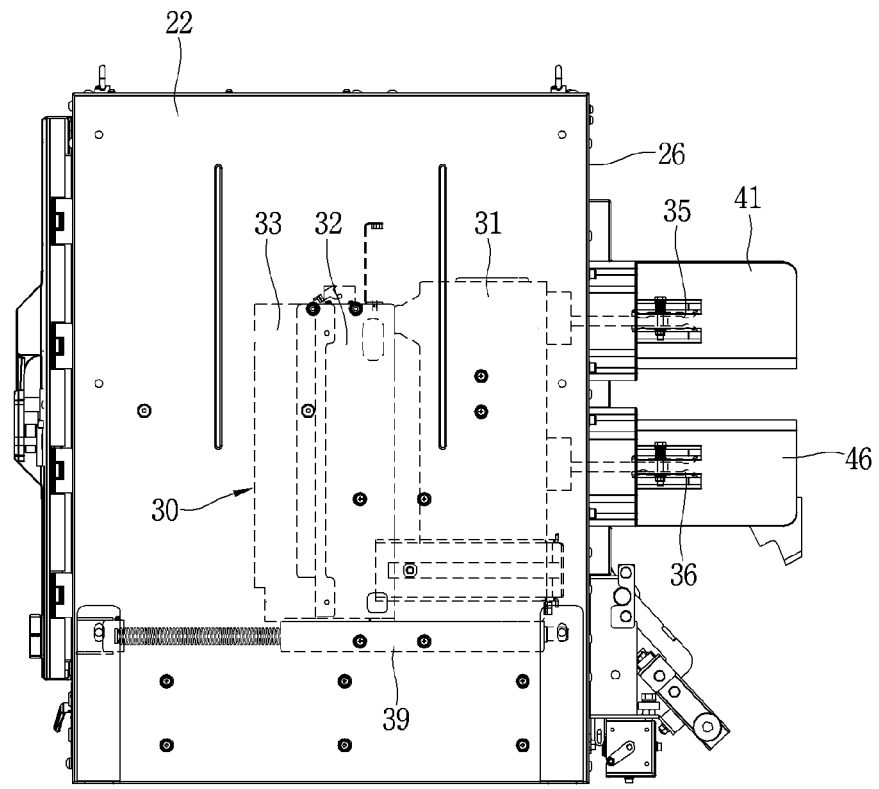
Figure 8:
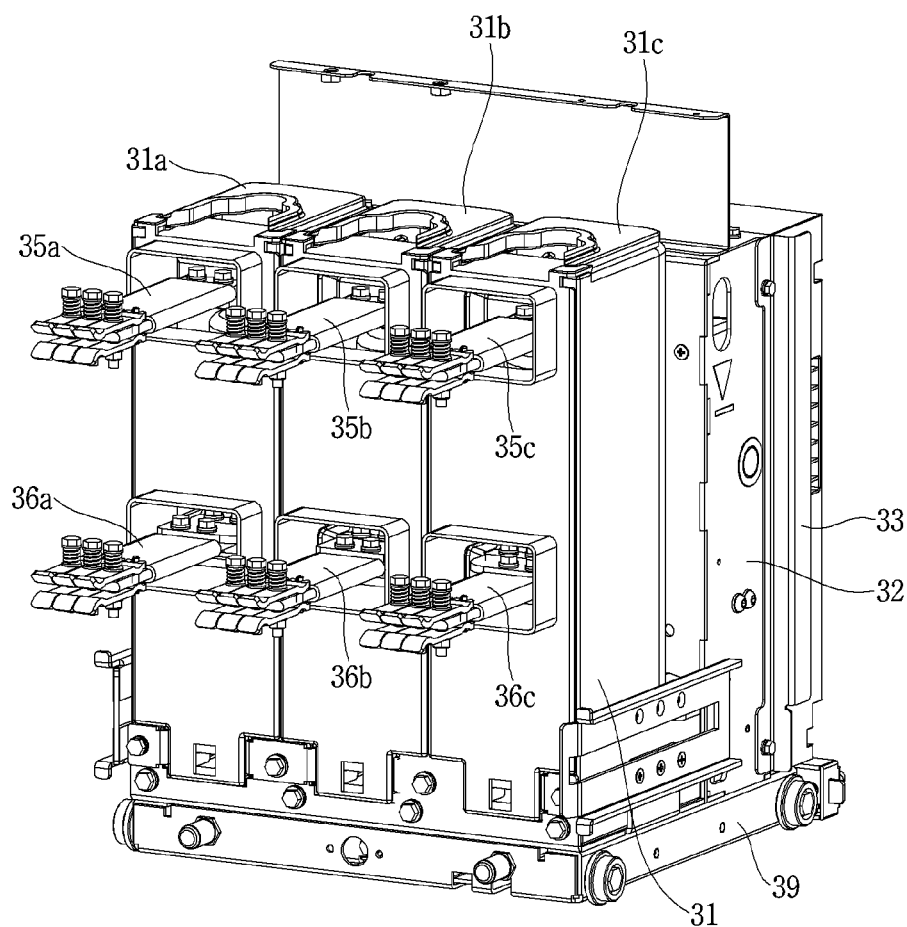
FIG. 8 is a rear perspective view of a circuit breaker used in a switchboard in accordance with one embodiment of the present disclosure.

Hereinafter, a switchboard in accordance with each embodiment of the present disclosure will be described in detail with reference to the accompanying drawings. FIG. 5 is a front view of a switchboard in accordance with one embodiment of the present disclosure. FIGS. 6 and 7 are lateral views of a circuit breaker compartment of the switchboard in accordance with the one embodiment of the present disclosure. FIG. 6 illustrates a state in which a circuit breaker is located at a test position, and FIG. 7 illustrates a state in which the circuit breaker is located at a service position. FIG. 8 is a rear perspective view of the circuit breaker used in the switchboard in accordance with the one embodiment of the present disclosure.

A switchboard 20 according to one embodiment of the present disclosure includes a first compartment 22 into which a circuit breaker 30 is inserted, a second compartment 25 that is adjacent to the first compartment 22 and in which bus bars 51 and 52 are received, and insulating bushings 41 and 46 installed on a barrier 26 where the first compartment 22 and the second compartment 25 come into contact with each other. Connecting conductors 61 and 66 are disposed on the insulating bushings 41 and 46. The connecting conductors 61 and 66 are connected with breaker terminals 35 and 36 at one side, and with the bus bars 51 and 52 at another side.

Hereinafter, an enclosure (cabinet) 21 of the switchboard 20 will be described first with reference to FIG. 5. The enclosure 21 of the switchboard according to the one embodiment of the present disclosure is divided into a plurality of compartments. For example, the enclosure 21 of the switchboard may include the first compartment (circuit breaker compartment) 22, the second compartment (bus bar and cable compartment) 25, a third compartment (current transformer compartment) 23, and a fourth compartment (low-voltage equipment compartment) 24.

In this embodiment, the first compartment 22 is located in a middle portion of the enclosure 21, and a power device such as a circuit breaker or the like is installed in the first compartment 22.

In this embodiment, the second compartment 25 is located in the rear of the enclosure 21, and power lines such as bus bars 51 and 52 or cables are installed in the second compartment 25. The second compartment 25 is adjacent to the first compartment 22, the third compartment 23, and the fourth compartment 24.

In this embodiment, the third compartment 23 is located in a lower portion of the enclosure 21, and a power device such as a current transformer or potential transformer is installed in the third compartment 23.

In this embodiment, the fourth compartment 24 is located in an upper portion of the enclosure 21 and a low-voltage device, a potential transformer, a current transformer, or an auxiliary device is installed in the fourth compartment 24.

FIGS. 6 and 7 are lateral views of the first compartment (circuit breaker compartment) 22 of the switchboard 20 according to the one embodiment of the present disclosure. FIG. 6 illustrates a state in which the circuit breaker 30 is located at a test position, and FIG. 7 illustrates a state in which the circuit breaker 30 is located at a service position.

The circuit breaker 30 is drawn in and out while being loaded on a truck 39 (or cradle).

The circuit breaker 30 includes a main circuit part 31, an opening and closing mechanism part 32, and a manipulation part 33. In the case of a vacuum circuit breaker, a vacuum interrupter having a fixed contact and a movable contact is disposed in the main circuit part 31.

In the main circuit part 31, breaker terminals 35 and 36 are connected to both ends (of the vacuum interrupter), respectively. The breaker terminals 35 and 36 include a first terminal 35 connected to a power source or a primary side and a second terminal 36 connected to a load or a secondary side. Since the first terminal 35 is connected to an upper portion of the main circuit part 31, it is also referred to as an upper terminal, and since the second terminal 36 is connected to a lower portion of the main circuit part 31, it is also referred to as a lower terminal.

The main circuit part 31 is generally configured to have three phases. That is, it has R phase, S phase, and T phase. For convenience, those phases are distinguished as a first phase, a second phase, and a third phase. The distinguishment of each phase uses subscripts a, b, and c. That is, those three phases are expressed as a first phase 31a, a second phase 31b, and a third phase 31c. (In this specification, subscripts a, b, and c are added to the reference numerals when distinguishment for phase is required.)

The breaker terminals 35 and 36 are also provided for each phase. Therefore, when it is necessary to distinguish the breaker terminals 35 and 36 for each phase, the subscripts a, b, and c are used. That is, the first terminal (upper terminal) 35 includes a first-phase first terminal 35a, a second-phase first terminal 35b, and a third-phase first terminal 35c, and the second terminal (lower terminal) 36 includes a first-phase second terminal 36a, a second-phase second terminal 36b, and a third-phase second terminal 36c.

Insulating bushings 41 and 46 are disposed on the rear of the first compartment 22 to protect the breaker terminals 35 and 36. The insulating bushings 41 and 46 include a first insulating bushing 41 disposed at an upper side to protect the first terminal 35, and a second insulating bushing 45 disposed at a lower side to protect the second terminal 36.

Since the insulating bushings 41 and 46 are also provided for each phase, subscripts a, b, and c are used when it is necessary to distinguish each phase. That is, the first insulating bushing 41 includes a first-phase first insulating bushing 41a, a second-phase first insulating bushing 41b, a third-phase first insulating bushing 41c, and the second insulating bushing 46 includes a first-phase second insulating bushing 46a, a second-phase second insulating bushing 46b, and a third-phase second insulating bushing 46c.

The insulating bushings 41 and 46 are formed of an insulating material to protect the breaker terminals 35 and 36 and improve insulation performance. The insulating bushings 41 and 46 are installed at the rear of the first compartment 22, that is, inside the second compartment 25. The Insulating bushings 41 and 46 are installed on a rear surface of the first compartment 22. Here, the rear surface of the first compartment 22 is common with a front surface of the second compartment 25, which will be referred to as a barrier 26. That is, the insulating bushings 41 and 46 are fixedly installed on the barrier 26.

Each of the insulating bushings 41 and 46 has a surface that mediates the connection between the breaker terminal 35, 36 and the bus bar 51, 52, and the surface is referred to as a contact surface 42 (42a, 42b, 42c). The contact surface 42 is exposed when the insulating bushing 41, 46 is viewed from the rear. (See FIG. 9)

Figure 9:
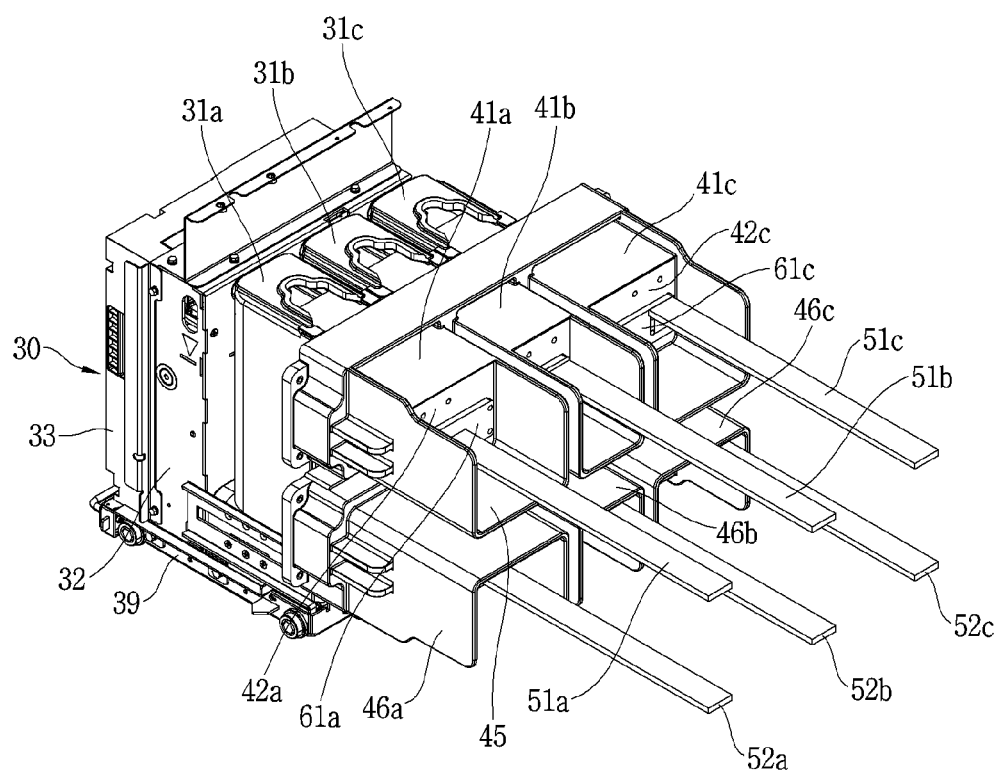
FIGS. 9 and 10 are a perspective view and a top view illustrating an operating state of a circuit breaker in a switchboard in accordance with one embodiment of the present disclosure, in which the circuit breaker, an insulating bushing, and bus bars are illustrated.
Figure 10:
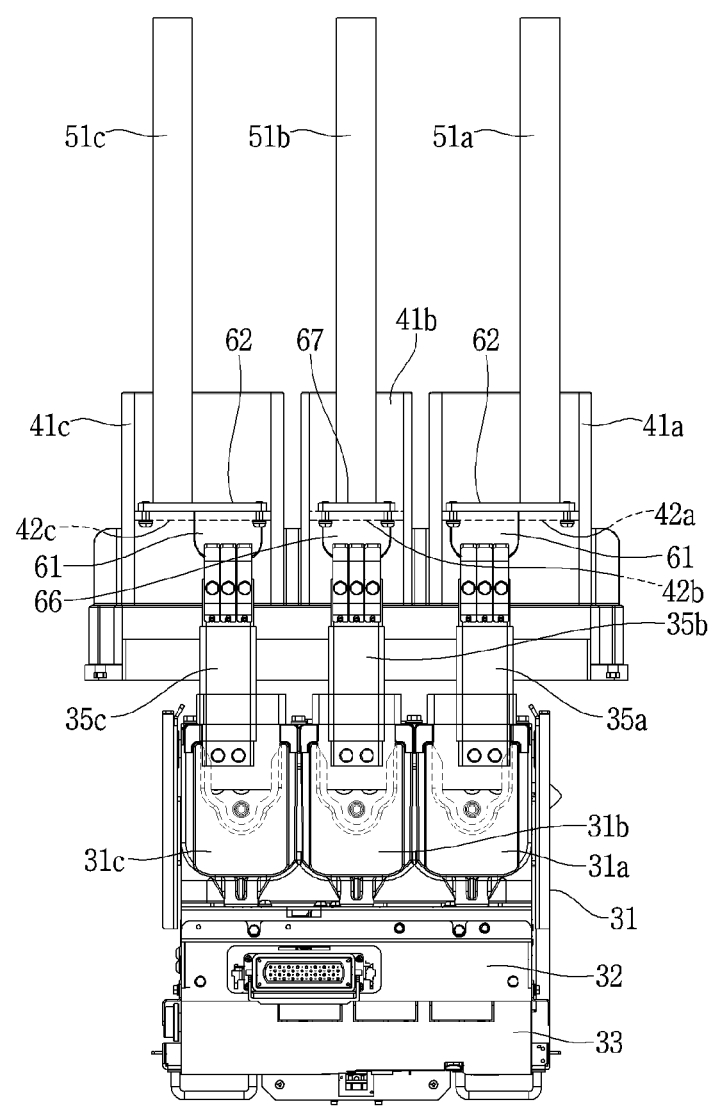

FIGS. 9 and 10 are a perspective view and a top view illustrating an operating state of the circuit breaker in the switchboard in accordance with the one embodiment of the present disclosure. The circuit breaker, the insulating bushings, and the bus bars are illustrated. In FIG. 10, some components are expressed with hidden lines so that the breaker terminals 35 and 36 are well exposed.

The bus bars 51 and 52 are provided for each phase. The bus bars 51 and 52 are disposed in the second compartment 25. The bus bars 51 and 52 include a first bus bar 35 connected to a power source or a primary side and a second bus bar 36 connected to a load or a secondary side. Since the bus bars 51 and 52 are also provided for each phase, subscripts a, b, and c are used when it is necessary to distinguish each phase. That is, the first bus bar 51 includes a first-phase first bus bar 51a, a second-phase first bus bar 51b, and a third-phase first bus bar 51c, and the second bus bar 52 includes a first-phase second bus bar 52a, a second-phase second bus bar 52b, and a third-phase second bus bar 52c.

Figure 11:
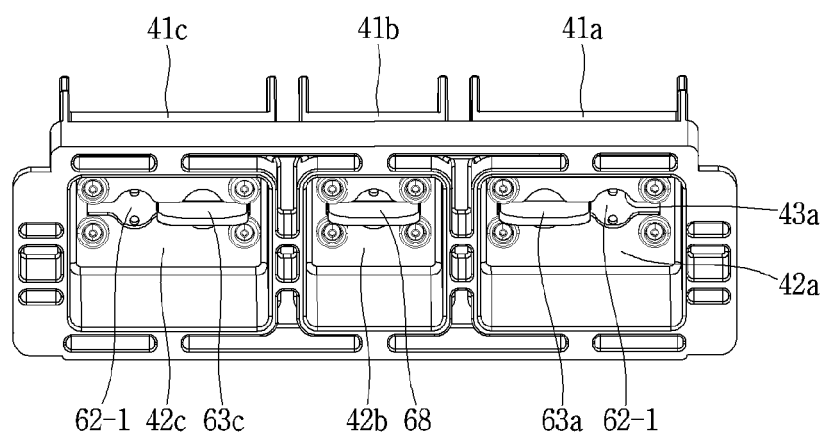
FIG. 11 is a perspective view illustrating a state in which insulating bushings and connecting conductors are coupled in a switchboard in accordance with an embodiment of the present disclosure.
Figure 12:
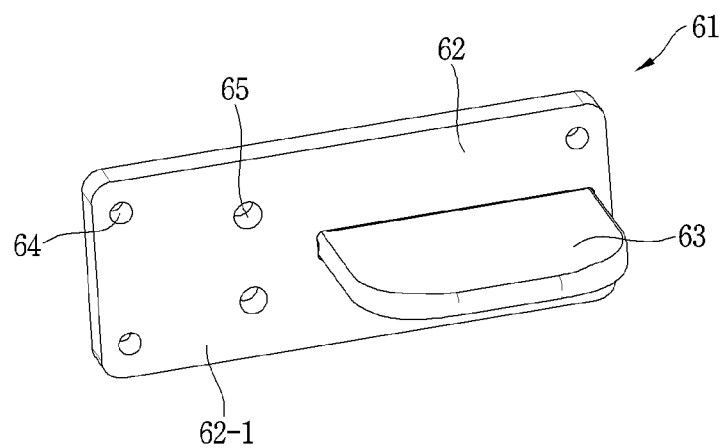
FIGS. 12 and 13 are perspective views illustrating the connecting conductors of FIG. 11.
Figure 13:
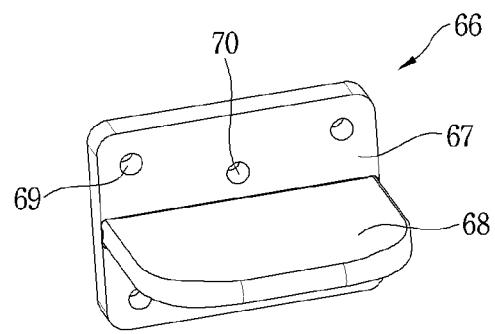
Figure 14:
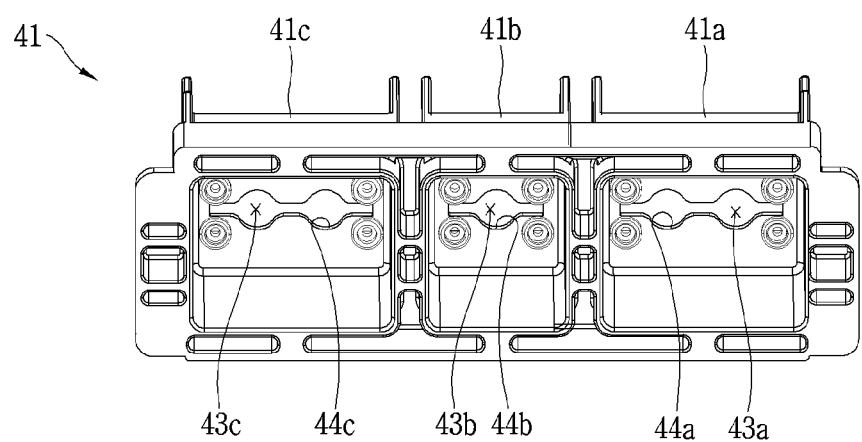
FIG. 14 is a perspective view illustrating the insulating bushing of FIG. 11.

FIG. 11 is a perspective view illustrating an assembly of the insulating bushing and the connecting conductor in the switchboard according to the one embodiment of the present disclosure. FIGS. 12 and 13 are perspective views illustrating the connecting conductor, and FIG. 14 is a perspective view illustrating the insulating bushing.

The insulating bushing 41, 46 is formed in a box shape with a front surface open. The insulating bushing 41, 46 may have a different size for each phase. Alternatively, the insulating bushing 41, 46 may be formed to have a different size from the insulating bushing 41, 46 of an adjacent phase. Mainly, the insulating bushing 41, 46 for each phase may have a different width in a horizontal direction. In this embodiment, widths of the first-phase insulating bushings 41a, 46a and the third-phase insulating bushing 41c, 46c are larger than a width of the second-phase insulating bushing 41b, 46b. Here, the width of the first-phase insulating bushing 41a, 46a and the width of the third-phase insulating bushing 41c, 46c may be formed to be the same.

A sliding hole 43 (43a, 43b, 43c) is formed in the contact surface 42 (42a, 42b, 42c) of the insulating bushing 41, 46. The sliding hole 43 (43a, 43b, and 43c) may be formed in the horizontal direction. Here, the sliding hole 43 (43a, 43b, and 43c) may have a different length for each phase. Alternatively, the length of the sliding hole 43 (43a, 43b, 43c) may be different from a length of another sliding hole 43 (43a, 43b, 43c) of an adjacent phase. In this embodiment, lengths of the sliding hole 43a of the first-phase insulating bushing 41a, 46a and the sliding hole 43c of the third-phase insulating bushing 41c, 46c are longer than a length of the sliding hole 43b of the second-phase insulating bushing 41b, 46b. Here, the length of the sliding hole 43a of the first-phase insulating bushing 41a, 46a and the length of the sliding hole 43c of the third-phase insulating bushing 41c, 46c may be the same.

A work groove 44 (44a, 44b, 44c) into which a tool for an assembling operation of the bus bar 51, 52 is formed in the sliding hole 43 (43a, 43b, 43c). The work groove 44 may be a single groove or may be provided in plurality. In this embodiment, the work groove 44b of the second-phase sliding hole 43b is single, and each of the work groove 44a of the first-phase sliding hole 43a and the work groove of the third-phase sliding hole 43c are provided in plurality (two).

An extension surface 45 extends from the insulating bushing 41, 46 toward the rear of the contact surface 42 to improve insulation efficiency of the bus bar 51, 52. The extension surface 45 may be a surface that extends from side surfaces and a lower surface of the insulating bushing 41, 46.

The connecting conductors 61 and 66 are provided. Each of the connecting conductors 61 and 66 is provided to mechanically and electrically connect the breaker terminal 35, 36 and the bus bar 51, 52. Since the breaker terminal 35, 36 and the bus bar 51, 52 are connected to each other by the connecting conductor 61, 66, it is not necessary to deform the breaker terminal 35, 36 or the bus bar 51, 52.

The connecting conductors 61 and 66 are made of a material with high conductivity, such as copper or aluminum. Each of the connecting conductors 61 and 66 includes a flat plate portion 62, 67 and an insertion portion 63, 68 vertically protruding from a middle portion of one surface of the flat plate portion 62, 67. Here, the connecting conductor 61, 66 may be formed symmetrically with respect to the insertion portion 63, 68. At this time, the connecting conductor 61, 66 may be formed symmetrically up and down with respect to the insertion portion 63, 68. In addition, the connecting conductor 61, 66 may alternatively be formed symmetrically or asymmetrically in left and right directions with respect to the insertion portion 63, 68. The flat plate portion 62, 67 is brought into contact with a rear surface of the contact surface 42 of the insulating bushing 41, 46, and the insertion portion 63, 68 is inserted into the sliding hole 43 (43a, 43b, 43c) of the contact surface 42 of the insulating bushing 41, 46.

The bus bar 51, 52 is coupled to the flat plate portion 62, 67 of the connecting conductor 61, 66, and the breaker terminal 35, 36 is connected to the insertion portion 63, 68 of the connecting conductor 61, 66.

The connecting conductors 61 and 66 may be separately manufactured as two parts of a first connecting conductor 61 and a second connecting conductor 66. An extension portion 62-1 extends to one side from the flat plate portion 62 of the first connecting conductor 61. In other words, the insertion portion 63 of the first connecting conductor 61 is biased to the one side.

The second connecting conductor 66 is formed by excluding the extension portion 62-1 from the first connecting conductor 61. In other words, the first connecting conductor 61 is formed by adding the extension portion 62-1 to the second connecting conductor 66.

Each of the connecting conductors 61 and 66 includes a plurality of fixing holes 64, 69 for assembling the connection connector 61, 66 to the insulating bushing 41, 46 by screws, and a plurality of assembly holes 65, 70 for assembling the bus bar 51, 52.

The sliding hole 43 (43a, 43b, and 43c) of the insulating bushing 41, 46 may be longer than the insertion portion 63, 68 of the connecting conductor 61, 66. At this time, a horizontal position of the insertion portion 63 may be adjusted by inserting the first connecting conductor 61 in a 180-degree turned state in a clockwise or counterclockwise direction.

Alternatively, the insertion portion 63, 68 may be slidable inside the sliding hole 43 (43a, 43b, 43c). That is, the second connecting conductors 66 may be applied to the first- and third-phase sliding holes 43a and 43c so as to adjust the horizontal positions of the connecting conductors 66 that are coupled to the insulating bushings 41, 46. Of course, at this time, a plurality of screw coupling holes should be formed in the insulating bushings 41, 46 or even the screw coupling holes should also be formed in a slit shape so that the connecting conductors can be fixed at various or arbitrary positions.

Although not illustrated separately, as another example, the insertion portion 63 of the first connecting conductor 61 may be formed to correspond to the length of the flat plate portion 62 of the first connecting conductor 61. In this case, the first connecting conductor 61 used in the first-phase sliding hole 43a and the first connecting conductor 61 used in the third-phase sliding hole 43c are equally fixedly inserted without changing a direction or sliding. Since the insertion portion 63 of the first connecting conductor 61 is formed sufficiently long, it can be used without changing the connecting conductor, regardless of a change in a phase-to-phase distance of the breaker terminals.

In addition, the insertion portion 63, 68 may be inserted into the sliding hole 43 (43a, 43b, 43c) in a state of being turned by 180 degrees in the clockwise or counterclockwise direction. For example, as in the state of FIG. 11, the first connecting conductor 61 may be disposed such that the insertion portion 63 is biased toward the second phase. The first-phase insertion portion 63a is disposed in the first-phase sliding hole 43a to be biased toward the second phase, and the third-phase insertion portion 63c is disposed in the third-phase sliding hole 43c to be biased toward the second phase. In this case, the first-phase breaker terminal 35a and the third-phase breaker terminal 35c are disposed closest to each other, and the first-phase bus bar 51a and the third-phase bus bar 51c are disposed farthest away from each other. Here, the first connecting conductor 61 installed in the first phase and the first connecting conductor 61 installed in the third phase are the same component and merely symmetrically disposed.

Alternatively, on the other hand, the first connecting conductors 61 may be disposed in the first-phase sliding hole 43a and the third-phase sliding hole 43c, respectively, so that the insertion portions 63a and 63c face outward. In this case, the first-phase breaker terminal 35a and the third-phase breaker terminal 35c are disposed farthest from each other, and the first-phase bus bar 51a and the third-phase bus bar 51c are disposed closest to each other.

When a distance between phases of the breaker terminal 35, 36 is the same as a distance between phases of the bus bar 51, 52, the breaker terminal 35, 36 and the bus bar 51, 52 can be connected to each other merely by the second connecting conductor 66.

Figure 15:
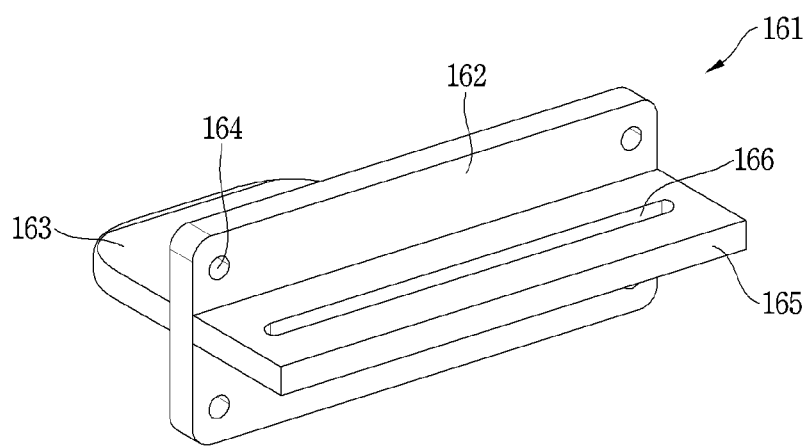
FIG. 15 is a rear perspective view illustrating a connecting conductor in accordance with another embodiment of the present disclosure.

FIG. 15 illustrates a first connecting conductor 161 according to another embodiment of the present disclosure. In this embodiment, since a flat plate portion 162, an insertion portion 163, and fixing holes 164 are the same as those in the previous embodiment, they will not be further described.

In this embodiment, a fixing bar 165 for fixing the bus bar protrudes vertically from a rear surface of the flat plate portion 162. At this time, the fixing bar 165 may have a length corresponding to a length of the flat plate portion 162. That is, the length of the fixing bar 165 is longer than a width of the breaker terminal or the bus bar. An assembly slit 166 is formed in the fixing bar 165. Since the assembly slit 166 is formed long, the bus bar can be fixed at an arbitrary position. An end portion of the bus bar applied here may be formed in a linear is shape or a shape like 'ㄷ'.

According to the present disclosure, the connecting conductor 61, 66 can be applied to correct a difference between the phase-to-phase distance of the breaker terminal 35, 36 and the phase-to-phase distance of the bus bar 51, 52.

In addition to the flat plate portion to which the bus bar is connected and the insertion portion to which the breaker terminal is connected, the connecting conductor may further include the extension portion extending from the flat plate portion, which can allow correction of the difference between the phase-to-phase distances.

The sliding hole into which the insertion portion can be inserted may be formed in the insulating bushing of the switchboard to be rotatable or slidable, thereby adjusting the position or arrangement of the connecting conductor.

While the invention has been shown and described with reference to the foregoing preferred implementations thereof, it will be understood by those skilled in the art that various changes and modifications may be made without departing from the scope of the invention as defined by the appended claims. Therefore, the implementation disclosed in the present disclosure are not intended to limit the scope of the present disclosure but are merely illustrative, and it should be understood that the scope of the technical idea of the present disclosure is not limited by those implementations. That is, the scope of protection of the present disclosure should be construed according to the appended claims, and all technical ideas within the scope of equivalents thereof should be construed as being included in the scope of the present disclosure.

The invention claimed is:

1. A switchboard comprising:
   a first compartment into which a circuit breaker having a plurality of breaker terminals is inserted;
   a second compartment adjacent to the first compartment and receiving a plurality of bus bars therein;
   a plurality of insulating bushings installed on a barrier that is in contact with the first compartment and the second compartment, including a first insulating bushing, a second insulating bushing, and a third insulating bushing,
   wherein the second insulating bushing is disposed between the first insulating bushing and the third insulating bushing in a horizontal direction,
   wherein each insulating bushing of the plurality of insulating bushings has a contact surface mediating a connection between an associated one breaker terminal of the plurality of breaker terminals and an associated one bus bar of the plurality bus bars, and includes a hole formed in the contact surface having a length defined in the horizontal direction,
   wherein each insulating bushing of the plurality of insulating bushings is provided with an associated connecting conductor of a plurality of connecting conductors,
   wherein each connecting conductor of the plurality of connecting conductors is connected on a first side to the associated one breaker terminal and on a second side to the associated one bus bar of the plurality of bus bars,
   wherein each connecting conductor of the plurality of connecting conductors includes:
      a flat plate portion to which the associated one bus bar of the bus bars is coupled; and
      an insertion portion of a given width defined in the horizontal direction, the insertion portion protruding in a vertical direction from the flat plate portion,
      wherein each insertion portion is inserted in the vertical direction through the hole defined through an associated insulating bushing of the plurality of insulating bushings. and is connected to the associated breaker terminal,
   wherein the hole defined in the first insulating bushing has a first length in the horizontal direction that permits the insertion portion inserted therethrough to have a first degree of movement in the horizontal direction,
   wherein the hole defined in the third insulating bushing has the first length in the horizontal direction that permits the insertion portion inserted therethrough the first degree of movement in the horizontal direction, and
   wherein the hole defined in the second insulating bushing has a second length in the horizontal direction, less than the first length, to permit the insertion portion inserted therethrough a second degree of movement in the horizontal direction that is less than the first degree of movement.

2. The switchboard of claim 1, wherein each insulating bushing is formed to have a different size from the insulating bushing of an adjacent phase.

3. The switchboard of claim 1, wherein a work groove for assembling the associated one bus bar of the plurality of bus bars is formed in the hole.

4. The switchboard of claim 1, wherein each connecting conductor of the plurality of connecting conductors is formed symmetrically with respect to the insertion portion in a third direction, perpendicular to the vertical direction and to the horizontal direction.

5. The switchboard of claim 1, wherein a length of the insertion portion in the vertical direction is equivalent to a length of the flat plate portion in the horizontal direction.

6. The switchboard of claim 1, wherein each connecting conductor of the plurality of connecting conductors further comprises an extension portion extending to one side in the horizontal direction from the flat plate portion.

7. The switchboard of claim 1, wherein the length of the hole in the horizontal direction is longer than a length of the insertion portion in the vertical direction.

8. The switchboard of claim 1, wherein each connecting conductor of the plurality of connecting conductors is provided with a plurality of fixing holes by which each connecting conductor of the plurality of connecting conductors is fixed to the associated insulating bushing of the plurality of insulating bushings.

9. The switchboard of claim 1, wherein each connecting conductor of the plurality of connecting conductors is provided with a plurality of assembly holes for assembling the associated bus bar of the plurality of bus bars.

10. The switchboard of claim 1, wherein a fixing bar protrudes in the vertical direction from a rear surface of the flat plate portion and fixes the associated one bus bar of the plurality of bus bars to the flat plate portion.

11. The switchboard of claim 10, wherein the fixing bar is provided with an assembly slit by which the associated one bus bar is fixed to the flat plate portion.

\* \* \* \* \*